Feb. 12, 1924.                                         1,483,190
                    A. KAEGI-TREULIN
            CENTERING DEVICE FOR WORK OR TOOL HOLDERS
                 Filed July 25, 1922        2 Sheets-Sheet 1
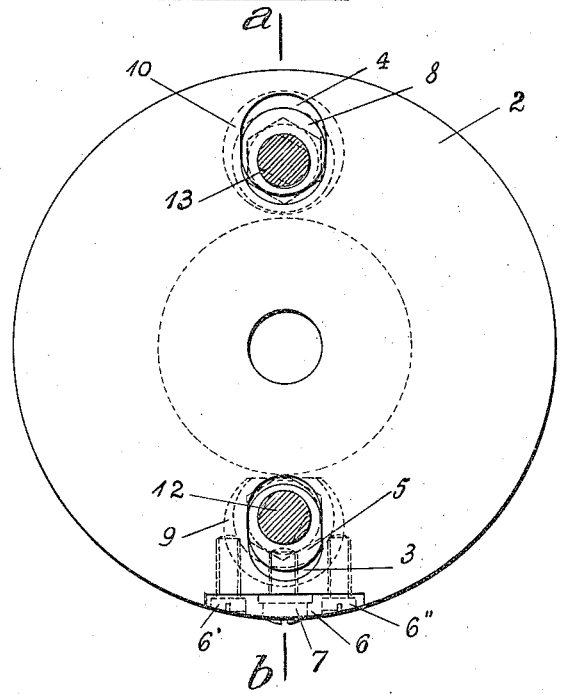
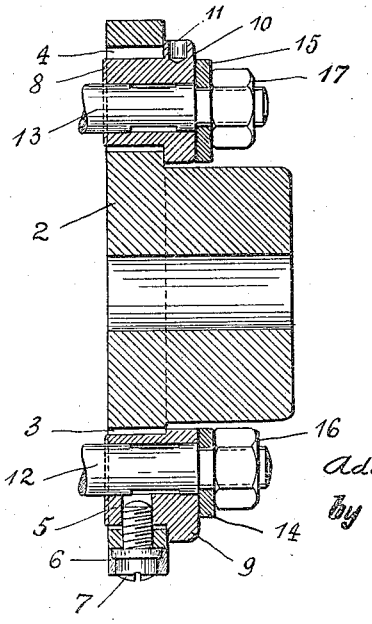
Inventor:-
Adolf Kaegi-Treulin
by
attorney Feb. 12, 1924.
A. KAEGI-TREULIN
1,483,190
CENTERING DEVICE FOR WORK OR TOOL HOLDERS
Filed July 25, 1922   2 Sheets-Sheet 2
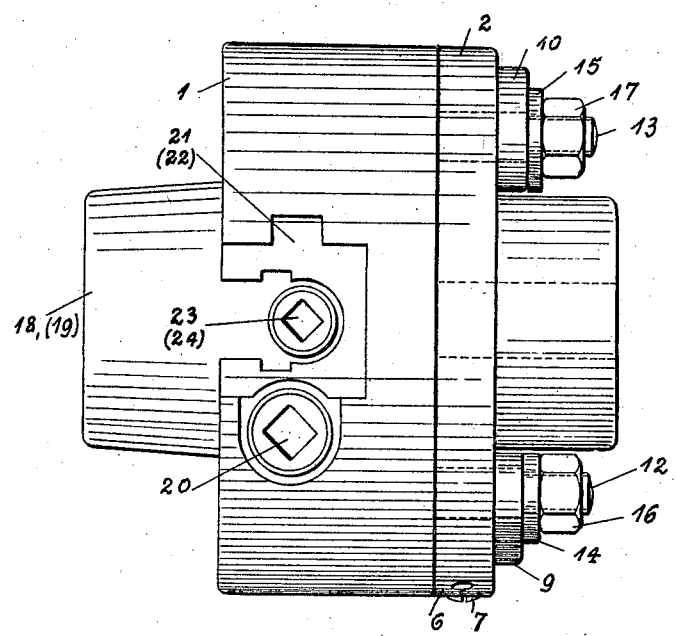
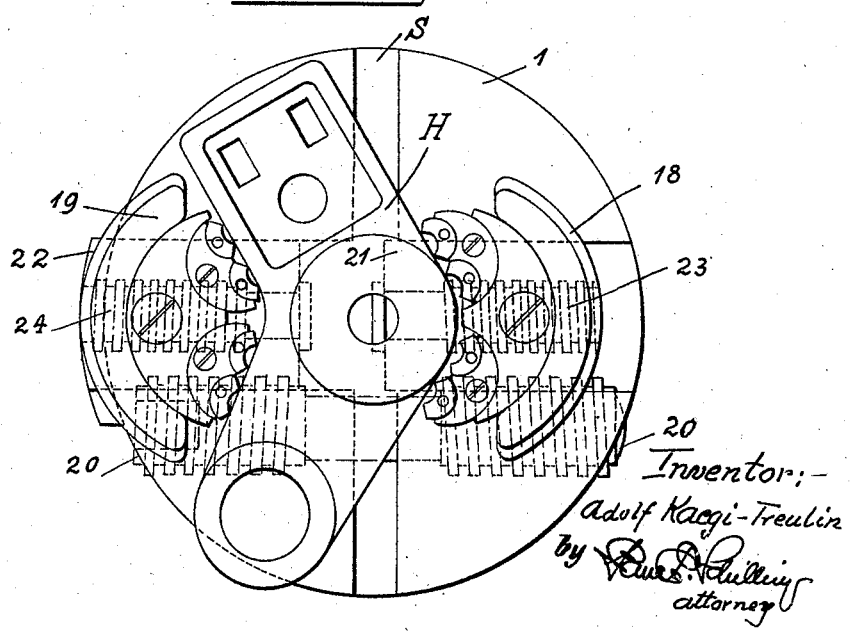
Inventor:-
Adolf Kaegi-Treulin
by attorney Patented Feb. 12, 1924.

1,483,190

UNITED STATES PATENT OFFICE.

ADOLF KAEGI-TREULIN, OF PFAEFFIKON, SWITZERLAND.

CENTERING DEVICE FOR WORK OR TOOL HOLDERS.

Application filed July 25, 1922. Serial No. 577,332.

*To all whom it may concern:*

Be it known that I, ADOLF KAEGI-TREU-LIN, a Swiss citizen, residing at Pfaeffikon, Switzerland, have invented certain new and useful Improvements in Centering Devices for Work or Tool Holders, of which the following is a specification.

My invention has reference to improvements in work or tool holders and relates more particularly to an improved centering device for such holders, and the object of the invention is to provide means in connection with machine tools, such as chucks, face plates, vises and the like, for quickly and accurately centering the tool or work piece in question, even if the latter should be of unsymmetrical or irregular shape. In the constructional embodiment of my invention I provide means for rough-centering in the shape of independently and jointly operable clamping jaws, and for fine-centering in the form of a relatively adjustable flange member, as will now be described in detail.

My invention will best be understood when described in connection with the accompanying drawings, in which Fig. 1 is a front view of the adjustable flange member with the securing bolts in section; Fig. 2 is a section on line $a$—$b$ of Fig. 1; Fig. 3 is a side view of a chuck, showing at the left one of the rough-centering clamping jaws and at the right the fine-centering flange member; Fig. 4 is a front elevation of the chuck with an irregularly contoured work piece in centered position.

On the rear face of the body 1 of the tool or work holder, which in the illustrated example is represented by a chuck, is mounted the flange member 2 which is provided with two diammetrically opposed guide slots 3 and 4 (Figs. 1 and 2). An adjusting nut 5 engages in the slot 3, into which nut threads in radial direction the headed screw bolt 7. This latter is rotatably, but not axially displaceably mounted in a seat member 6 secured in the correspondingly recessed flange rim by means of the screws 6' and 6''. By manipulating the screw bolt 7 the nut 5 can be displaced in radial direction within its guide slot. Within the other guide slot 4 an eccentric 8 is rotatably mounted. The nut 5 as well as the eccentric 8 are provided with collars 9 and 10 respectively, the collar 10 presenting a socket 11 for the insertion of a tool (not shown here) for rotating the eccentric. The nut 5 and the eccentric 8 are mounted on the screw bolts 12 and 13 respectively, the inner ends of which latter thread into the chuck body 1 and on whose outer ends are respectively mounted the washers 14 and 15 and the nuts 16 and 17. By tightening these latter nuts the chuck body and the flange member can be locked together in the adjusted position.

On the front face of the chuck body are mounted the clamping jaws 18 and 19, which are operable for rough-centering and which can be jointly actuated in well known manner by the common screw spindle 20 displacing the supporting slide members 21 and 22 respectively in opposite directions. Each jaw can, further, be operated independently of the other jaw by its own screw, the jaw 19 by the screw 24 mounted in the slide 22, and the jaw 18 by screw 23 mounted in slide 21, as clearly shown in Figs. 3 and 4. The slot S shown in this latter figure serves for the introduction of stops.

The operation of the described device is as follows:—For centering a work piece, for instance the bell-crank H (Fig. 4) it is first rough-adjusted between the clamping jaws 18 and 19 by first operating the common spindle 20 and then the individual spindles 23 and 24; this can readily be accomplished with an accuracy, as regards the center position, of as little as $\frac{1}{32}$ of an inch. Next, the nuts 16 and 17 are loosened when the clutch body 1 can be fine-adjusted on the flange member 2 by proper manipulation of the adjusting nut 5 and the eccentric 8, whereby as the flange member is rigidly mounted on the machine spindle, the chuck body can be relatively displaced with great exactness on the stationary flange member until the tool or work piece is accurately centered, when it is secured in the adjusted position by locking the clutch body to the flange member by tightening the nuts 16 and 17.

This fine-adjustment to the exact centering position is obtained far more rapidly and easily than if it were obtained by further manipulation of the clamping jaws and their individual supports.

What I claim is:—

1. In a work or tool holder of the character set forth, in combination, a body member, clamping means for rough-adjustment on the one face of said body member; a flange member mounted on the other face of said body member and presenting two diametrically opposed guide slots and adapted to be mounted on the machine spindle; and means for allowing of displacement of said body member relative to said flange member, comprising an adjusting nut operable in one of said flange member slots and an eccentric operable in the other flange member slot, and means supporting, and operating through, said adjusting nut and said eccentric respectively for clampingly retaining the relatively displaced parts in the adjusted position.

2. In a work or tool holder of the character set forth, in combination, a body member, clamping means for rough-adjustment on the one face of said body member; a flange member on the other face of said body member, said flange member presenting two diametrically opposed guide slots, an adjusting nut in the one slot, means for controlling the operative displacement of said adjusting nut within its slot, an eccentric freely operable in the other guide slot, and screw bolt means in association with said adjusting nut and said eccentric respectively for normally clamping said body member to said flange member and for temporarily allowing relative displacement of said body member on said flange member within the limits of said slot-guided means.

3. In a work or tool holder of the character set forth, in combination, a body member, clamping means for rough-centering on the one face of said body member, comprising clamping slides positively jointly operable in opposite directions, clamping jaws mounted on said slides and each jaw operable independently of the other; means for fine-centering purposes, comprising a flange member on the other side of said body member, said flange member presenting two diametrically opposed guide slots and a marginal recess in association with one of said guide slots, a seat member in said marginal recess, an adjusting nut in said guide slot facing said marginal recess, means for securing said seat member in position on said flange member, and means operable in said seat member for controlling the relative radially directed displacement of said adjusting nut within its guide slot, an eccentric freely operable in the other guide slot and including means for rotating the same and independent means supporting, and operable through, said adjusting nut and said eccentric respectively for enabling said body member to be displaced relative to said flange member and for clampingly retaining these two members in the adjusted operative position.

In testimony whereof I affix my signature.

ADOLF KAEGI-TREULIN.